United States Patent [19]

Doi et al.

[11] Patent Number: 4,508,396
[45] Date of Patent: Apr. 2, 1985

[54] METHOD OF PRODUCING BEARING COMPONENT

[75] Inventors: Motomichi Doi; Kinpei Okano; Katsutoshi Nii, all of Hitachi; Yoshiharu Yokota, Mobara, all of Japan

[73] Assignee: Hitachi, Ltd., Tokyo, Japan

[21] Appl. No.: 378,172

[22] Filed: May 14, 1982

[30] Foreign Application Priority Data

May 22, 1981 [JP] Japan .................................. 56-76607

[51] Int. Cl.$^3$ ...................... F16C 33/66; F16C 33/00; F16C 33/32; C25D 5/50
[52] U.S. Cl. ..................................... 384/463; 204/37.1 384/492; 384/548
[58] Field of Search ......... 308/173, 187, 188, DIG. 9, 308/241; 204/25, 37 R, 40

[56] References Cited

U.S. PATENT DOCUMENTS

| | | |
|---|---|---|
| 2,354,763 | 8/1944 | Machlett . |
| 4,072,368 | 2/1978 | Ehrentraut ...................... 308/241 X |
| 4,088,803 | 5/1978 | Kubo et al. .................. 204/37 R X |
| 4,092,448 | 5/1978 | Coll-Palagos ................ 204/37 R X |
| 4,176,014 | 11/1979 | Ruscoe et al. ................ 204/37 R X |
| 4,293,171 | 10/1981 | Kakumoto et al. ............. 308/241 X |

FOREIGN PATENT DOCUMENTS 49-5586  1/1974  Japan .

Primary Examiner—John M. Jillions
Assistant Examiner—Thomas R. Hannon
Attorney, Agent, or Firm—Antonelli, Terry & Wands

[57] ABSTRACT

A method of producing a bearing component such as an inner ring, an outer ring and rolling elements having a solid lubricant on a frictional surface part thereof, which comprises a step of forming a coating of a material on a frictional surface part of a metal substrate, the solubilities of the coating material in the substrate metal and in the solid lubricant being higher than the mutual solubility of the substrate metal and the solid lubricant, a step of providing on a surface part of the coating a solid lubricant consisting of a metallic material having a low solubility in the substrate metal, and a step of maintaining the solid lubricant, the coating and the metal substrate for a predetermined period of time at a predetermined temperature of below the lower one of the maximum operating temperature of the bearing component and the melting point of the solid lubricant so as to induce mutual diffusion between the metal substrate, the coating and the solid lubricant, thereby increasing the bonding strength between them, and a bearing comprising the bearing component produced by the method.

6 Claims, 5 Drawing Figures

METHOD OF PRODUCING BEARING COMPONENT

This invention relates to a method of producing a bearing component which constitutes a solid-lubricated bearing used, for example, for an X-ray tube and to a bearing comprising the bearing component.

In general, lubrication of a bearing is effected by supplying a liquid lubricant such as an oil to the frictional part of each component of the bearing, for example, an outer ring, an inner ring, rolling elements, a cage member, a shaft, etc. However, in some cases the liquid lubricant can not be used because of the temperature or atmosphere to which they are subjected. For instance, in such conditions as high temperature, a high degree of vacuum, low temperature or a radioactive atmosphere, liquid lubricants tend to be evaporated, solidified or deteriorated, losing their lubricating function. U.S. Pat. No. 2,354,763 discloses an example of a bearing in which a solid lubricant is used in place of a liquid lubricant when liquid lubricants can not be used. However, in the example described in the U.S. patent, the coating of solid lubricant was liable to be exfoliated and the process for coating the solid lubricant was complicated. In Japanese Patent Publication No. 5586/74, it is disclosed to produce rolling elements for a bearing from tungsten carbide when liquid lubricants are inapplicable. However, it is difficult to produce rolling elements of tungsten carbide with good accuracy, and tungsten carbide is poor in shock resistance and wear strength.

As to the materials for a metallic substrate composing a solid-lubricated bearing and for a solid lubricant to be coated on the surface of the substrate, for example, when a ferrous material is used for the substrate, it is preferable to use silver or lead as the solid lubricant. This example of material application is particularly desirable, from the viewpoint of use or forming, in the case of a bearing for an X-ray tube which employs a small-diameter rolling bearing of a shaft diameter of 10 mm or less and is used at a high temperature of not lower than 300° C. in a high vacuum of at least $10^{-6}$ torr.

The reasons why silver or lead is desirable as the solid lubricant are as follows: (1) it is hardly soluble in, and hardly adhered to, other metals, particularly ferrous metals; (2) therefore adhesive wear is reduced when silver or lead is used as solid lubricant; (3) it is highly adaptive since it is a soft metal; (4) since silver has a low vapor pressure even at high temperatures, it is hardly lost through evaporation and it pollutes the atmosphere very little, etc.

However, when silver or lead is used as a solid lubricant for a bearing, the characteristic feature of hardly being adhered to the ferrous metal constituting the substrate offers a problem itself. Namely, when silver or lead is coated on a frictional surface of the substrate (this is required for using it as a solid lubricant in a bearing), mere coating of it on the substrate will result in the exfoliation thereof for the above-mentioned reasons.

It seems that the problem of exfoliation encountered in the case of bonding such materials to each other can be solved relatively easily by a conventional technique in which an element easily soluble in both the substrate and the solid lubricant is previously disposed between them by an ion plating method with the intention of obtaining a sufficient adhesion strength therebetween (e.g., Japanese Patent Laid-open Publication No. 138929/78).

However, the ion plating method is inadvantageous in that a solid lubricant film produced by the method is liable to exfoliate when used in a bearing component and that the method is low in productivity. The ion plating method is particularly unsuitable to mass-produced single-kind articles such as roller bearing. The reason is that the method requires processing in vacuum, complicated apparatus, troublesome operations, high techniques for the process and rigorous setting of optimum process conditions. In addition, since the process is carried out in an isolated atmosphere of vacuum, the setting of the thickness of the film, for example, may require an extremely large volume of experimental work. Furthermore, the yield of the material is low. Namely, in the ion plating method on which silver or lead is vaporized in a vacuum and is coated on a substrate being applied with a high voltage, all the vaporized silver or lead is not coated effectively on the substrate, but rather, a considerable amount of the metal is deposited on the interior walls of the vacuum vessel or on parts inside the vessel. This is a great loss, in view of the soaring price of silver.

This invention is made in consideration of the circumstances mentioned above.

Accordingly, an object of this invention is to provide a method of producing a solid-lubricated bearing and a bearing component of high effectiveness in use at a high productivity, by which a layer of a solid lubricant hardly adherable to a substrate can be coated on the substrate easily and securely.

The method of the present invention which attain such an object as above is characterized in that, in a method of producing a solid-lubricated bearing component by coating a frictional surface of a metallic substrate for constituting a bearing component such as an inner ring, outer ring, rolling element or the like with a solid lubricant consisting of a metal which is different from the substrate metal and is hardly adherable to the substrate metal, the substrate is coated with at least one layer of an element having a solubility in the solid lubricant before coating the substrate with the solid lubricant, then a solid lubricant consisting of a metallic material having a low solubility in the substrate metal is provided on the surface of the coating layer, and the whole is subjected to a diffusion heat treatment comprising heating at a temperature of below the lower one of the highest operating temperature of the bearing and the melting point of the solid lubricant.

The diffusion heat treatment is carred out in such thermal conditions as to ensure that an elemental metal acting as a solid lubricant exists at a surface part of the solid lubricant layer, while the other part of the solid lubricant layer and the intermediate coating layer are alloyed with each other by mutual diffusion to increase the bonding strength at the interface therebetween and to enhance the mechanical properties of the bulk of both the intermediate coating layer and the solid lubricant layer.

On the other hand, the bearing of this invention is characterized in that an intermediate coating layer of substantially uniform thickness is provided between a solid lubricant layer of Ag or Pb and a metallic substrate, the strength of bonding between the solid lubricant and the intermediate coating layer and that between the coating layer and the metallic substrate are increased by the mutual diffusion of the materials, the surface part of the solid lubricant consists of elemental Ag or Pb, and the mechanical properties of the bulk of the coating layer and the solid lubricant are enhanced by the alloying arising from the mutual diffusion.

Accordingly, based particularly on the fact that a rigid alloy layer can be obtained by heating two kinds of metals to a high temperature to induce mutual diffusion of the metals, this invention aims at producing a bearing component of high adhesion strength by relatively simple means, that is, by coating on a substrate of a bearing at least one layer of an element having a high solubility in the substrate, heat-treating the substrate and the coating, and further coating a solid lubricant thereon, followed by a heat treatment so as to cause mutual alloying of the layers.

Incidentally, diffusivity of a metal is briefly discussed below.

The concentration Cx of a diffusing metal A in a diffusion model varies depending on the distance x, time t and the diffusivity D, as expressed by the following equation (1):

$$Cx = Co + \left\{1 - \phi\left(\frac{x}{2\sqrt{Dt}}\right)\right\} (Cs - Co) \quad (1)$$

where Cs and Co are concentrations determined by the following boundary conditions $$C = Co \text{ at } t = 0 \text{ and } 0 < x < \infty$$
$$C = Cs \text{ at } x = 0 \text{ and } 0 < t < \infty$$

The function $$\phi\left(\frac{x}{2\sqrt{Dt}}\right)$$

in the equation (1) is Gauss' error function, the relationship between $$\phi\left(\frac{x}{2\sqrt{Dt}}\right)$$

and $$\frac{x}{2\sqrt{Dt}}$$

is shown in FIG. 2.

It is clear from FIG. 2 that the concentration Cx at a given distance x increases as the diffusivity D and time t increase.

Since the diffusivity D is larger at a higher ambient temperature, it is favorable to carry out the diffusion heat treatment at a higher temperature. The above explanation applies also to the diffusion of metal B into metal A. Ferrous metals, which are generally used as material for the substrate of a bearing, and a solid lubricant of silver or lead are hardly soluble in each other. Therefore, if silver or lead is directly coated on a bearing substrate, the adhesion between the substrate and the coating is poor and the coating is liable to exfoliate. Furthermore, since the ferrous metal displays alloy phases as a result of addition of carbon and other various alloying elements and of heat treatments, it has a D value smaller than those of pure metals. However, in the method of this invention, as described above, an element highly soluble in ferrous metals is coated on a ferrous metal substrate, the thus obtained material is heated to a predetermined temperature for diffusion treatment to form a pure metallic element layer adhered to the ferrous metal with a sufficient adhesion strength. Then, at least one layer of an element having a solubility in silver or lead higher than that of the ferrous metal, or of an element having a high solubility in the previously coated element, is further coated and the whole is subjected to a duffusion heat treatment to induce mutual alloying of the layers, thereby enhancing the connection between them.

Other features and effects of this invention will be apparent from the following description of the examples, referring to the attached drawings wherein.

Figure 1:
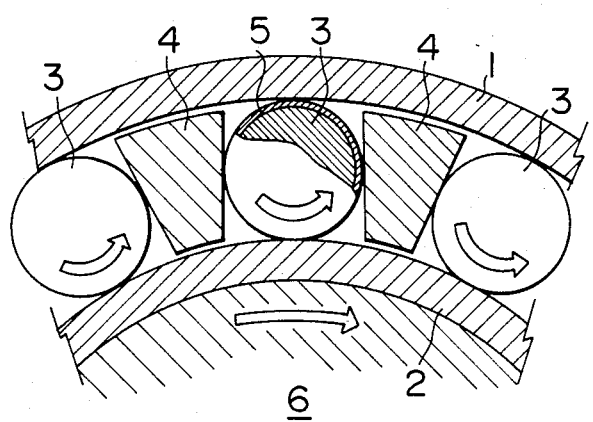
FIG. 1 is a partial sectional view of a bearing comprising rolling elements which are the solid-lubricated bearing component produced by the method of this invention.

FIG. 1 is a sectional view of a part of a rolling bearing comprising the rolling elements (3) produced by the method of this invention, in which numeral 1 denotes an outer ring, numeral 2 denotes an inner ring, numeral 4 denotes rolling element supporting members (the rings 1, 2 and the members 3 are made of high speed steel), numeral 5 denotes a solid lubricant and an intermediate coating layer, and numeral 6 denotes a shaft 6. In this example, the outside peripheral surface of the rolling element made of high speed steel is finally ocated with a silver layer which acts as the solid lubricant. The shaft 6 is made of high speed steel. The maximum operating temperature of the high speed steels is about 550° C.

Figure 4:
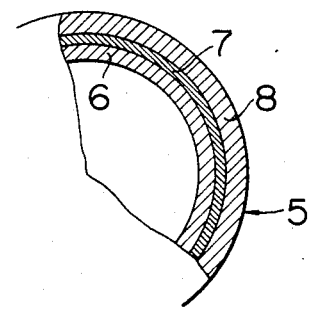
FIG. 4 is a partial sectional view of the rolling element shown in FIG. 1 and shows the enlarged details of the solid lubricant and the intermediate coating layer provided for the rolling element.
Figure 2:
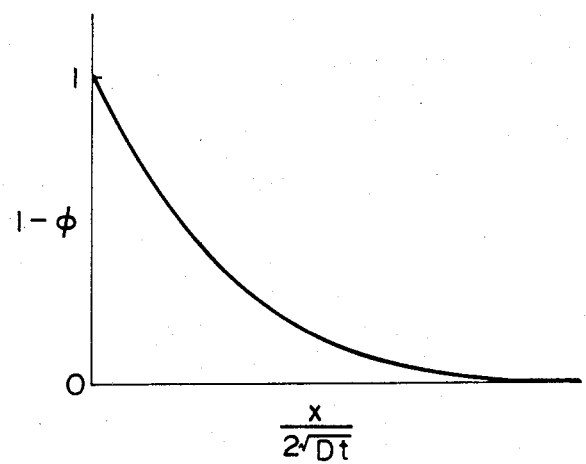
FIG. 2 is a graph showing Gauss' error function.
Figure 3A:
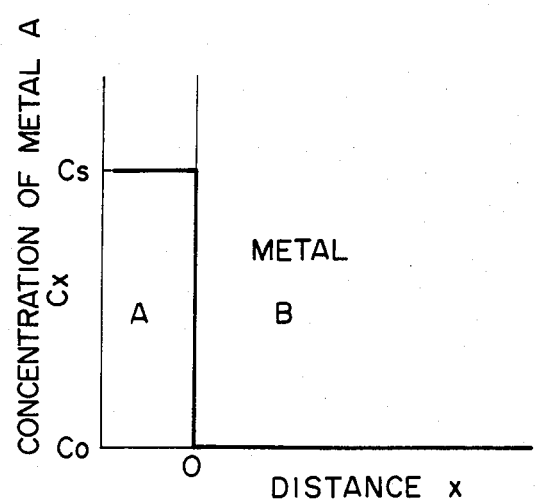
FIGS. 3a and 3b are model diagrams showing the diffusion conditions of metals.
Figure 3B:
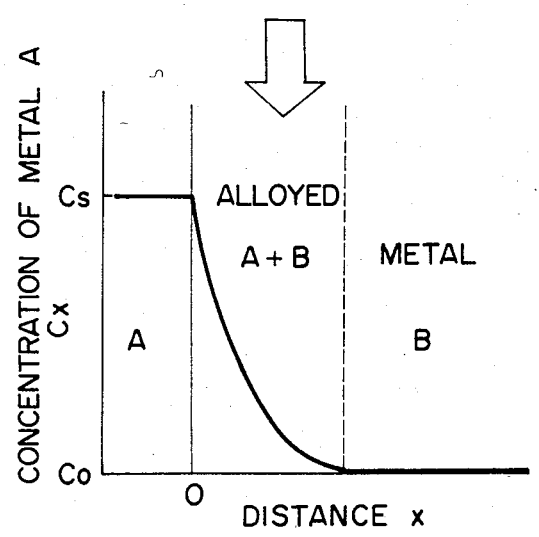

Firstly, the rolling element 3 is sufficiently washed and degreased. Then an element more soluble than silver in bearing steels, for example, nickel was coated as a first intermediate layer on the peripheral surface of the rolling element 3 in a thickness of 0.1–0.3 μm, for example, by electroplating. The Ni bath used in electroplating was one containing 100–300 g of NiCl₂ and 50–150 g of HCl per 1 l of aqueous nickel solution. The rolling elements 3 were placed in a conductive basket which was immersed in the Ni bath, and electroplating was carried out at a current density of 4–5 A/dm² for 30 sec to 2 min. A preferable bath temperature is 10°–25° C. In the electroplating process, the basket is swung at a frequency of 0.1–1 times per second and at an amplitude of 1–10 cm, whereby the rolling elements 3 are moved freely in the basket and nickel 6 (FIG. 4) is deposited on the peripheral surfaces of the rolling elements in a substantially uniform thickness. As is shown in FIG. 4, a copper layer 7 is then deposited on the outside peripheral surface of the nickel layer 6 by electroplating, in a thickness smaller than that of the nickel layer 6 and in the range of 0.05–0.2 μm. The copper bath used for the electroplating was one containing 20–70 g (preferably 40–60 g) of CuCN, 30–70 g (preferably 40–60 g) of KCN and 40–80 g (preferably 50–70 g) of potassium sodium tartrate per 1 l of aqueous copper solution. The same basket as used in the Ni electroplating step was immersed in the copper bath, the rolling elements were placed in the basket and electroplating was conducted at a current density of 4–5 A/dm$^2$ for 10–60 sec. A preferable bath temperature is 40°–60° C. The basket was swung in the same swinging conditions as in Ni electroplating, whereby a copper coating layer 7 is formed on the surface of the nickel layer 6 in a substantially uniform thickness. Then, a silver layer 8 acting as a solid lubricant is deposited on the surface of the copper coating layer 7 by electroplating, in a thickness larger than that of the Ni layer 6 and in the range of 0.2–0.6 $\mu$m. The silver bath used was one containing 20–60 g (preferably 30–50 g) of AgCN, 55–95 g (preferably 65–85 g) of KCN and 5–25 g of $K_2CO_3$ per 1 l of aqueous silver solution. The same conductive basket as used in the Ni electroplating step was immersed in the silver bath, the rolling elements 3 were placed in the basket and electroplating was conducted at a current density of 0.2–1.0 A/dm$^2$ for 1–5 min. A preferable bath temperature is 40°–60° C. The basket was swung in the same manner as in the Ni electroplating step, whereby a silver coating 8 was formed on the surface of the Cu layer 7 in a substantially uniform thickness. It is preferable that the total thickness of the Ni layer, the Cu layer and the Ag layer is in the range of 0.4–1.0 $\mu$m. Then, the rolling elements having the Ag layer in addition to the Ni and Cu coating layers thereon were maintained at a temperature of not higher than 550° C. (the maximum operating temperature for the high-speed steel), preferably 500°–540° C. in a reduction gas atmosphere ($H_2$ gas) or in a reducing atmosphere, preferably in a vacuum of about $10^{-5}$ torr for 30 min to 2 hours. By this heat treatment, mutual diffusion was induced between the Ag layer, the Ni and Cu coating layers and the metal substrate over the entire surfaces thereof, resulting in that the Ag layer and the Ni and Cu coating layers were rigidly bonded to the metal substrate. In this case, as a result of the above-mentioned diffusion heat treatment conditions in addition to the above-mentioned layer thickness criteria (wherein the thickness of the Ag layer is set to be larger than that of the Cu layer), the pure silver layer displaying a lubricating action remains even after the diffusion heat treatment, and the coating layers other than the pure silver layer and the part between the coating layer and the pure silver layer are entirely alloyed with each other, whereby mechanical properties are improved and the pure silver layer is made to be less liable to exfoliate. In addition, the melting point of silver used as the solid lubricant metal is about 960° C., whereas the final diffusion heat treatment is carried out at a temperature of 550° C. at maximum, so that the silver can not melt during the treatment.

When the intermediate coating layers or the solid lubricant layer is not substantially uniform in thickness, or when the thicknesses of the layers are in excess of the above-mentioned ranges, the solid lubricant becomes more liable to be exfoliated, for example, by a local deformation arising from the stresses applied to the rolling elements during operation thereof.

Besides, rolling bearings must satisfy the requirements of very high dimensional accuracy. Particularly, the shape and the surface roughness of the rolling elements and the inner and outer rings have great effects on the performance of the bearing. Therefore, when a solid lubricant is coated on the surfaces of these components, the lubricant must be applied in the smallest thickness possible and the surfaces roughness must be reduced. According to this invention, a metallic element easily soluble in the ferrous metal constituting the material for the bearing is coated on a bearing component and then, after a diffusion treatment or without this diffusion treatment, a layer of an element easily soluble in silver is provided thereon, whereby silver can be adhered to the bearing component in a minimum required thickness. Thus, it is possible to reduce the thickness of the solid lubricant film to 1 $\mu$m or less.

For maintaining a high accuracy of a rolling bearing, the inner and outer rings and the rolling elements are always treated as a unitary combination. Therefore, it is desirable that the heat treatments for the bearing components are carried out in the condition where the components are assembled into a unit. However, when the components are heat-treated in the assembled condition, they may adhere to each other.

For this reason, the heat treatment is conducted while surrounding each bearing component with a powder of a nonmetallic solid lubricant such as $MoS_2$, $WS_2$, $NbSe_2$ and $SWe_2$ of a particle size of 0.5–5 $\mu$m. In this case, since the bearing components are separated from each other by the nonmetallic solid lubricant, it is possible to conduct a diffusion heat treatment without causing any adhesion between the components. The above-mentioned nonmetallic solid lubricant has also an effect of promoting the running-in of a solid-lubricated rolling bearing, it is not necessary to remove the nonmetallic lubricant after the heat treatment.

Although the bearing component to be treated was the rolling element in the above-described example, other components such as outer ring, inner ring, rolling element support member, bearing holder part, shaft, etc. can also be treated in the same manner. In the case of a rolling bearing, since a solid lubricant given to rolling elements is applied with compressive stresses, it is less liable to exfoliate as compared with the case of providing the lubricant on an outer or inner ring.

In addition, although electroplating was used as a means for coating a metal on a substrate in the above-described example, this is preferably merely because of the short treating time and, of course, other means can also be used, e.g., vacuum deposition, sputtering, friction coating method, etc.

In the example described above, a ferrous metal, particularly bearing steel was used as the material for the substrate, silver being used for the solid lubricant layer, and nickel and copper being used as elements to be interposed between the substrate and the lubricant layer. This is an example of use of materials suitable to the most usual bearing, and other materials may, of course, be used according to the kind, use and etc. of the bearing.

As has been stated above, this invention is based on the fact that when metals are heat-treated at a high temperature, they can form an alloy through mutual diffusion, thereby increasing the adhesion strength, and the parts of layers other than surface parts are also alloyed and strengthened. In the method of this invention, at least one intermediate layer of an element having a solubility into the solid lubricant (silver or lead) higher than solubility of a substrate of bearing thereinto is provided between the solid lubricant and the substrate, and the whole body is heat-treated to induce alloying between the layers. Therefore, a solid-lubricated bearing comprising a coating of silver, lead, or the like with high adhesion strength can be produced easily and inexpensively.

Accordingly, a solid-lubricated bearing component comprising a coating of silver or lead can be obtained without employing the ion plating method which requires expensive equipment and high technique. There is also obtained a bearing comprising a solid lubricant having a higher adhesion strength as compared to those produced by the ion plating method.

What is claimed is:

1. A method of producing bearing components such as an inner ring, an outer ring, a rolling element and a shaft having a solid lubricant at a frictional surface part of a metal substrate constituting a bearing component, said method comprising the steps of:

providing an intermediate coating layer of a material having a substantially uniform thickness on the frictional surface part of said metal substrate by electroplating, the solubility of said material in the substrate metal and in the solid lubricant being higher than the mutual solubility between the substrate metal and the solid lubricant, electroplating on a surface part of said intermediate coating layer a solid lubricant which has a substantially uniform thickness of 0.2–0.6 μm and which consists of an elemental metal having a lower solubility in said substrate metal, and maintaining under a reducing atmosphere said solid lubricant, said coating layer and said metal substrate for a predetermined period of time at a predetermined temperature of below the lower one of the maximum operating temperature of the bearing component and the melting point of the solid lubricant to ensure that the elemental metal exists at a surface part of the solid lubricant layer and to induce mutal diffusion between the substrate metal, the coating material and the solid lubricant so that a part of the lubricant layer other than the surface part and the intermediate coating layer are alloyed with each other by said mutual diffusion, thereby increasing the bonding strength between the substrate metal, the coating material and the solid lubricant, the total thickness of the intermediate coating layer and the solid lubricant layer being 0.4–1.0 μm; and the heat treatment for diffusion being conducted with the bearing components assembled and with a powder of a nonmetallic solid lubricant placed between said assembled bearing components.

2. A method according to claim 1, wherein the metal substrate consists of a ferrous material, the intermediate coating layer consists of copper or gold alloy, and the solid lubricant consists of silver or lead alloy except for the surface thereof.

3. A method of producing bearing components such as an inner ring, an outer ring, a rolling element and a shaft having a solid lubricant of silver at a frictional surface part of a metal substrate of ferrous material constituting a bearing component, said method comprising the steps of:

providing a coating layer having a substantially uniform thickness on said frictional surface part of said metal substrate by electroplating, the solubilities of the material of the coating layer in said ferrous material and in the silver lubricant being higher than the mutual solubility of the ferrous material and the silver lubricant, said coating layer comprising a nickel layer bonded to said frictional surface part and a gold or copper layer bonded to said nickel layer, the thickness of the nickel layer being larger than that of the gold or copper layer, electroplating said solid lubricant on a surface part of said coating layer which solid lubricant has a substantially uniform thickness of 0.2–0.6 μm and which consists of silver having a low solubility in said ferrous material and is thicker than said nickel layer, and maintaining under a reducing atmosphere said solid lubricant, said coating layer and said metal substrate for a predetermined period of time at a temperature lower than the maximum operating temperature of the bearing component to induce mutual diffusion of the substrate metal, the coating material and the lubricant while still permitting elemental silver to remain on the surface part of the solid lubricant layer and a part of the lubricant layer other than the surface part and the coating layer are alloyed with each other by said mutual diffusion, thereby increasing the bonding strength between the metal substrate, the coating layer and the solid lubricant and strengthening by alloying the coating layer and the other part within the interior of the solid lubricant, the total thickness of the coating layer and the solid lubricant layer being 0.4–1.0 μm; and the heat treatment for inducing diffusion being conducted with the bearing components assembled and with a powder of a nonmetallic solid lubricant placed between said assembled bearing components.

4. A method according to claim 3, wherein the thickness of the solid lubricant layer is 0.2–0.6 μm, the thickness of the Ni layer is 0.1–0.3 μm and the thickness of the Au or Cu layer is 0.05–0.2 μm, the total thickness of the intermediate coating layers and the solid lubricant layer being 0.4–1.0 μm.

5. A method according to claim 3, wherein the heat treatment for inducing diffusion is conducted at a temperature of 500°–540° C. for 30 minutes to 2 hours in the reducing atmosphere.

6. A method according to claim 1 or 3, wherein said nonmetallic solid lubricant is at least one kind selected from the group consisting of $MoS_2$, $WS_2$, $NbSe_2$ and $WSe_2$.

* * * * *